United States Patent [19]
Cordaro et al.

[11] Patent Number: 6,124,378
[45] Date of Patent: *Sep. 26, 2000

[54] (ZINC, CADMIUM, MAGNESIUM) ALUMINATE-GALLATE-CONTAINING ORGANIC-BINDER PAINT AND FILM ARTICLES

[75] Inventors: James F. Cordaro, Ridgecrest; Lynn E. Long, Manhattan Beach, both of Calif.

[73] Assignee: Hughes Electronics Corporation, El Segundo, Calif.

[ * ] Notice: This patent is subject to a terminal disclaimer.

[21] Appl. No.: 09/145,696

[22] Filed: Sep. 2, 1998

Related U.S. Application Data

[63] Continuation-in-part of application No. 08/819,751, Mar. 18, 1997, Pat. No. 5,807,909.

[51] Int. Cl.$^7$ ..................................................... C09K 21/14
[52] U.S. Cl. ........................... 523/179; 106/19; 524/434; 428/327; 428/328; 428/329
[58] Field of Search .............................. 523/179; 244/124, 244/133; 524/434; 106/19; 428/327, 328, 329

[56] References Cited

U.S. PATENT DOCUMENTS 2,269,508  1/1942  Barton .
4,111,851  9/1978  Shai .
5,094,683  3/1992  Rafla-Yuan .
5,589,274  12/1996  Long .

FOREIGN PATENT DOCUMENTS 0 681 911  11/1995  European Pat. Off. .

OTHER PUBLICATIONS

Hatsutori, Toshio "Durable Spinel Pigment Compositions and Their Use", Chemical Abstracts, vol. 121, No. 18, Oct. 31, 1994, Abstract No. 207718.

*Primary Examiner*—Veronica P. Hoke
*Attorney, Agent, or Firm*—Terje Gudmestad; M. W. Sales

[57] ABSTRACT

An article is a liquid or solid mixture of a plurality of particles and a binder. The article may be a paint or a freestanding film. The particles have a composition $A[xAl(1-x)Ga]_2O_{4+\gamma}(\delta In)$, wherein A is zinc, magnesium, and/or cadmium, the value of x is from 0 to 1, the value of $\delta$ is from 0 to about 0.2, and the value of $\gamma$ is less than about 0.2. In the liquid paint mixture, a paint vehicle is also typically present to impart the desired fluidity to the mixture. The solid paint or film made using this material is white, has very low solar absorptance, and may be made electrically conductive by doping the particles with indium or other appropriate dopant.

29 Claims, 4 Drawing Sheets

(ZINC, CADMIUM, MAGNESIUM) ALUMINATE-GALLATE-CONTAINING ORGANIC-BINDER PAINT AND FILM ARTICLES

This application is a continuation-in-part of application Ser. No. 08/819,751, filed Mar. 18, 1997 now U.S. Pat. No. 5,807,909, for which priority is claimed.

BACKGROUND OF THE INVENTION

This invention relates to passive thermal control articles, and, more particularly, to paint and freestanding film articles useful in spacecraft thermal control applications.

Spacecraft are subjected to a wide range of thermal environments during service. One side of the spacecraft may face free space, while the other side faces the sun. Heat is radiated into free space to cool the spacecraft, but the spacecraft can be heated intensively in direct sunlight.

Active and passive temperature control techniques are used to maintain the interior temperature of the spacecraft, which contains persons or sensitive instruments, within acceptable operating limits. Active temperature control usually involves machinery or electrical devices, such as electrical heaters and heat pipes. The present invention deals with passive temperature control.

An established approach to passive temperature control is the use of surface coatings, typically termed "paints", on the external surface of the spacecraft, or solar films (sometimes termed "blankets") overlying the external surface of the spacecraft. A white paint or film, for example, has a low solar absorptance, while a black paint or film has a high solar absorptance. The selective application of such paints to various elements of the spacecraft exterior greatly aids in controlling its temperature. Solar films function similarly, except that they are freestanding articles that are bonded to or suspended over a surface. The present invention deals with a white paint and a white solar film that are useful in spacecraft temperature control applications.

In most cases, the paint or film article must dissipate electrostatic charges that develop on the external surface of the spacecraft, as well as provide passive thermal control. The charges would otherwise accumulate to cause arcing and possible damage to, or interference with, sensitive electronic equipment on or in the spacecraft. In order to dissipate electrostatic charge, the paint or film article must be somewhat electrically conductive, with a surface resistivity on the order of about $10^9$ ohms per square or less.

A spacecraft paint, whatever its color, should exhibit additional characteristics for spacecraft applications. The paint should be stable during long-term service in a space environment. The paint is desirably moderately tough and flexible so that it does not crack and flake away as it is flexed due to mechanical or thermal strains.

There are white, electrostatic-dissipative, organic-binder paints known for spacecraft use. The best of the known organic-binder paints, based upon the aluminum-doped zinc oxide pigment of the type disclosed in U.S. Pat. No. 5,094,693, whose disclosure is incorporated by reference, typically has a solar absorptance of from about 0.18 to about 0.22. No white, electrostatic-dissipative paints of lower solar absorptance are available. The lower the value of the solar absorptance, the lower the heating of the paint and thence the underlying substrate, in intense direct sunlight.

There is a need for improved white thermal-control paint and film articles that are operable and stable in a space environment, which have a low solar absorptance, and which can manage electrostatic discharge (ESD). The present invention fulfills this need, and further provides related advantages.

SUMMARY OF THE INVENTION

The present invention provides white, particulate-containing paint and film articles. The particulate material is mixed with an organic binder and with a paint vehicle to form a liquid paint, which is then applied to a substrate and dried, or is mixed with an organic binder and processed to form a film. The resulting paint and film articles have a lower solar absorptance than any other paint or film articles suitable for spacecraft applications. The pigment, paint, and film may be made in an electrically conductive form that dissipates electrostatic charge on the painted surface. The paint and film of the invention reach the limit of optical performance for passive white thermal control paints with organic binders. The paint is stable in properties, durable, and suitable for use in a spacecraft environment.

In accordance with the invention, an article comprises a mixture of pigment particles and an organic binder. Each particle has a composition of $A[xAl(1-x)Ga]_2O_4(\delta D)$, wherein A is selected from the group consisting of zinc, magnesium, and cadmium, and mixtures thereof, D is a cationic dopant having an ionic valence greater than +2 or an ionic dopant, the value of x is from 0 to 1, and the value of $\delta$ is from 0 to about 0.2. A is most preferably zinc. Magnesium may be substituted for some but not all of the zinc, and cadmium may be substituted for some or all of the zinc. The dopant D, where present, is preferably indium, supplied as indium oxide.

The solid particle composition $A[xAl(1-x)Ga]_2O_4(\delta D)$ is a shorthand notation for a range of doped and undoped particle compositions extending between $AAl_2O_4$ and $AGa_2O_4$, which range includes the end points and the compositions therebetween. These undoped compositions, measured in an organic paint binder, have solar absorptances $\alpha$ of about 0.14–0.17, well below the solar absorptance available in any other organic-binder paint suitable for spacecraft use. Varying the composition of the particles (by varying x) allows the index of refraction of the particle to be changed from a lower value when x is 1 to a higher value when x is 0. The index of refraction in part determines the "hiding power" or opacity of the paint. The ability to vary the index of refraction of the particle allows the selection of the hiding power according to the application.

Additionally, the composition may be doped with small amounts of cationic dopants D, such as indium (In), having a valence of greater than +2, or anionic dopants D such as chlorine ($Cl^-$) or fluorine ($F^-$), which impart electrical conductivity to the composition. The notation ($\delta D$) as used herein indicates an addition of a small concentration $\delta$ of a dopant element D into the composition, usually as an oxide, and which substitutes for some of the zinc or cadmium in the spinel crystal structure.

The dopant D, when used, is normally provided in the form of an oxide. The particle composition may be equivalently expressed as $(A,\delta D)[xAl(1-x)Ga]_2O_{4\pm\gamma}$, wherein the value of x is from 0 to 1, the value of $\delta$ is less than about 0.2 (i.e., 20 atomic percent), and the value of $\gamma$ is less than about 0.2. This notation also emphasizes the fact that the dopant D, preferably indium, substitutes for zinc or cadmium atoms and preferentially resides on the zinc and/or cadmium lattice sites. The beneficial results are not achieved if the dopant D of +3 valence, such as indium or other elements of similar size, resides on the aluminum or gallium lattice sites. However, beneficial results may also be achieved if a dopant resides on the (Zn,Cd), Al, or Ga sites when the dopant has a +4 valence or greater, as, for example, in the case of $Ti^{+4}$, which may reside on the Al and/or Ga sites. Beneficial results may also be obtained if the dopant is anionic, such as chlorine ($Cl^-$) or fluorine ($F^-$). The quantity $\gamma$ indicates additional small amounts of oxygen that may be added to the composition with the dopant D, as when indium is added as indium oxide. This small addition of oxygen does not adversely affect the operability of the invention, and may be beneficial in reducing the tendency for formation of color centers in the material.

The particle compositions $A[xAl(1-x)Ga]_2O_4$ have a spinel crystal structure, whether undoped or doped with the small amount of the dopant D. (As used herein, "spinel" includes normal spinels, inverse spinels, and mixtures thereof.) Within the range covered by this formulation, the indicated elements may be varied or minor amounts of other elements may be substituted for the indicated elements in a substitutional solid solution. For example, when the dopant indium is added in the form of indium oxide, the oxygen content may increase a small amount above the nominal O=4 value, which is acceptable as long as the structure remains a spinel or spinel solid solution. In another example, a solute element may be substituted for the zinc, aluminum, or gallium, as long as the composition remains a single-phase spinel crystal structure. That is, subject to the indicated constraints, small solid-solution variations away from the indicated nominal composition $A[xAl(1-x)Ga]_2O_4(\delta D)$ are within the scope of the invention.

In addition to the described $A[xAl(1-x)Ga]_2O_4(\delta D)$ pigment particles, the material may contain active or inert secondary particles to modify the optical properties and/or the mechanical properties of the final material. Active secondary particles interact optically with incident energy, and include, for example, aluminum-doped zinc oxide particles such as described in U.S. Pat. No. 5,094,693. Inert secondary particles are those which serve primarily as filler to increase the volume fraction of particulate material present without greatly modifying the optical properties. Inert secondary particles can include, for example, barium sulfate, clay, or talc.

The solid particulate material may be mixed with a binder such as an organic silicone, initially in a flowable liquid composition but subsequently in a solid composition after curing and/or drying. The binder binds the particles together into a coherent mass, as for a paint bonded to the surface of a substrate article or a freestanding film. For use as a paint, the particulate and binder are initially mixed with a liquid paint vehicle, which serves to allow the mixing and applying of the paint to the substrate and thereafter dries and evaporates to leave the paint coating mixture of particles and binder adhered to the substrate.

The solid particulate material may instead be mixed with a film-forming binder such as a polyimide, a polyester, polytetrafluoroethylene, or Mylar™ polymer (polyethylene terephthalate polyester) and formed into a plastic-like free-standing polymer film having the desired solar absorptance properties. This polymer film may be applied to or suspended above the surface of the substrate for thermal control, instead of painting. Significantly, the present approach allows the film itself to be made with a white color and in a thickness that is typically about 0.002–0.003 inches. In prior approaches to the making of white films for spacecraft use, a white paint having a thickness of 0.004–0.005 inches was applied to a film substrate that was 0.002–0.003 inches thick, for a total of 0.006–0.008 inches thick. The present approach reduces the thickness and weight of the white film to about ⅓–½ of the thickness and weight attained with the prior approach, while achieving superior thermal properties.

The present invention provides an important advance in the art of thermal-control paints, films, and other articles. The pigment used in the paint is white and has a very low solar absorptance. It may be made either as an electrical insulator or as an electrical conductor with sufficiently low electrical resistivity to dissipate electrostatic charges. The paint prepared with organic binders is easily applied and is very smooth after drying. The paint is durable and suitable for use on spacecraft in extended missions. Other features and advantages of the present invention will be apparent from the following more detailed description of the preferred embodiment, taken in conjunction with the accompanying drawings, which illustrate, by way of example, the principles of the invention. The scope of the invention is not, however, limited to this preferred embodiment.

DETAILED DESCRIPTION OF THE INVENTION

Figure 1:
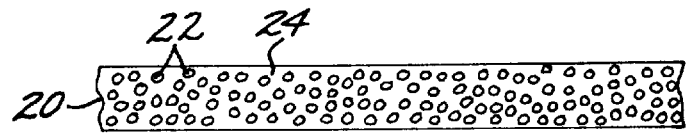
FIG. 1 is a side elevational view of a paint layer according to the invention.

FIG. 1 illustrates a paint layer 20 prepared according to the invention. The paint layer 20 comprises particles 22 mixed with a binder 24. (The particles are also sometimes referred to as a "pigment".) Prior to drying, a paint vehicle is also present, but the paint vehicle is evaporated during the drying operation. The composition of the particles, the binder, and the paint vehicle, their proportions, and the preparation of the paint layer will be described in greater detail subsequently.

Figure 2:
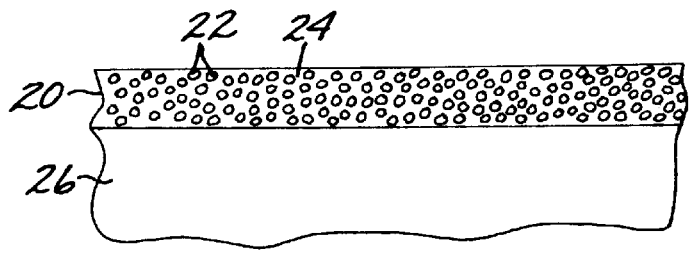
FIG. 2 is a side elevational view of the paint layer of FIG. 1, as applied to a substrate.

FIG. 2 illustrates the paint layer 20 applied to a substrate 26.

Figure 3:
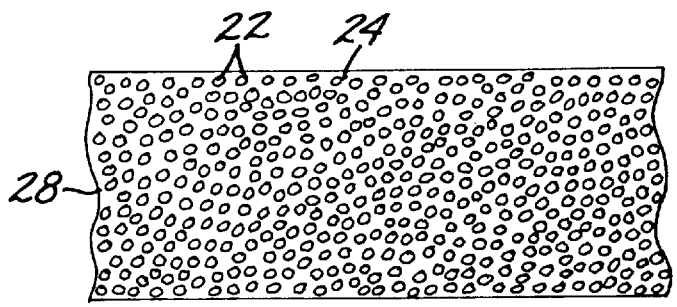
FIG. 3 is a side elevational view of a freestanding film according to the pigment of the invention.

FIG. 3 illustrates a polymer film 28 having particles 22 dispersed therein. The polymer film is prepared as a freestanding article which may be applied to a surface, placed above a surface, or affixed to a surface as with hook-and-loop fasteners.

Figure 4:
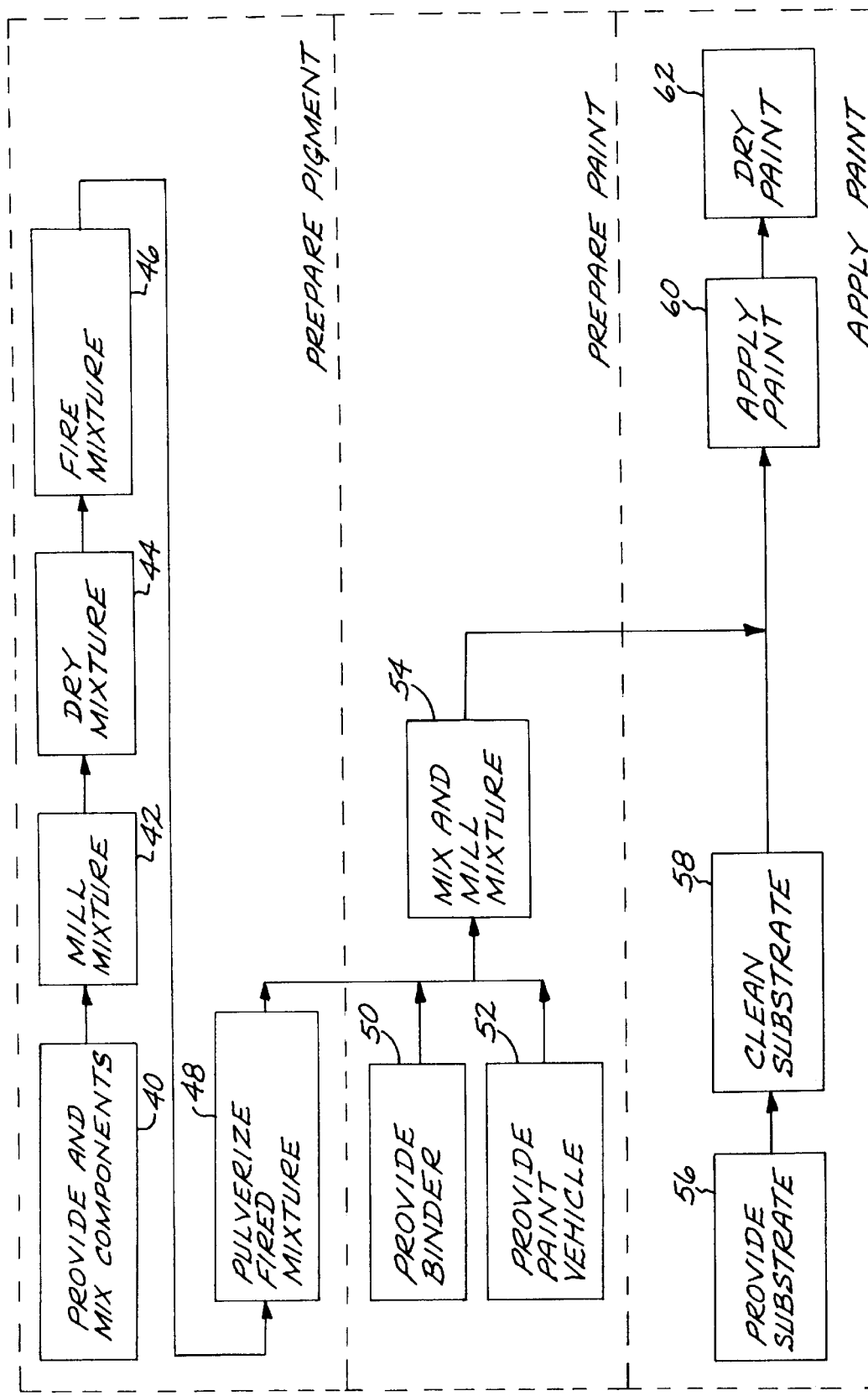
FIG. 4 is a block diagram of a method for the preparation of a white paint according to the invention and the painting of a substrate.

FIG. 4 depicts a preferred method for preparing the particles 22, for preparing the paint used in the paint layer 20 and the polymer film 28, and for painting the substrate.

To prepare the pigment or particles 22, the components are provided and mixed together, numeral 40. In the most general form, the particles have a composition stated by $A[xAl(1-x)Ga]_2O_4(\delta D)$. wherein A is zinc, magnesium, or cadmium, D is a cationic dopant having an ionic valence greater than +2 or an anionic dopant, the value of x is from 0 to 1, and the value of $\delta$ is from 0 to about 0.2 (i.e., 20 atomic percent). The dopant D, where present, is preferably indium, supplied as indium oxide. The composition of the particles is selected from this formulation, and may be any composition within this range.

Preferably, A is zinc, and the application of the invention will be discussed primarily in terms of this preferred embodiment. (Magnesium may be substituted for some but not all of the zinc, and cadmium may be substituted for some or all of the zinc.) In this preferred embodiment, if x and $\delta$ are both 0, the composition is the undoped $ZnGa_2O_4$, a material termed a zinc gallate. If x is 1 and $\delta$ is 0, the composition is the undoped $ZnAl_2O_4$, a material termed a zinc aluminate. If x is between 0 and 1, and $\delta$ is 0, the composition is the undoped $Zn[xAl(1-x)Ga]_2O_4$, a material termed a zinc aluminate-gallate. Indium-doped versions of all of these compositions may be made by making $\delta$ nonzero, but no greater than the maximum value of about 0.2 indicated above.

The compositions of the form $Zn[xAl(1-x)Ga]_2O_4(\delta D)$ are of the spinel crystal structure and are solid solutions based upon the end point compositions $ZnGa_2O_4$ and $ZnAl_2O_4$. As used herein, "spinel" includes normal spinels, inverse spinels, and mixtures thereof. In the normal spinel structure, generally notated as $AB_2O_4$, oxygen anions form a face-centered-cubic close packed structure, with the zinc atoms in the tetrahedral A sites and the aluminum and/or gallium atoms in the octahedral B sites. In the inverse spinel structure, also of the $AB_2O_4$ type but sometimes represented as $B(AB)O_4$, the distribution of zinc and aluminum and/or gallium in the tetrahedral and octahedral sites is altered. In the inverse spinel, all of the A ions and one-half of the B ions are on the octahedral sites, while the remaining half of the B ions are on the tetrahedral sites, hence the notation $B(AB)O_4$. The normal spinel and inverse spinel structures represent end points of a continuum, so that, for example, a particular composition may be a mixture of 95 percent normal spinel and 5 percent inverse spinel. All of the normal spinel, inverse spinel, and mixtures thereof, having the composition $Zn[xAl(1-x)Ga]_2O_4(\delta D)$, are within the scope of the invention.

This composition range $Zn[xAl(1-x)Ga]_2O_4(\delta D)$ is chosen because of the properties achieved. The compositions are white in color with very low solar absorptances. Zinc is selected as the A-site cation in the particle composition of the invention, rather than other cations such as magnesium, because the resulting structure may be doped with small amounts of indium or other dopants to make the composition sufficiently electrically conductive to permit dissipation of electrostatic charges on the surface of the spacecraft. The aluminum and gallium cations are selected as the B-site cations in the particle composition.

The zinc aluminates, zinc gallates, and zinc aluminate-gallates comprise a range of compositions of a very few known pure white spinels which can be doped to achieve electrical conductivity. Another, but less preferred, such spinel is of the form $Cd[xAl(1-x)Ga]_2O_4(\delta D)$, where x, $\delta$, and D are as discussed above, and this spinel is also within the scope of the invention. A number of other spinets have been evaluated and excluded from the present invention. All of the following spinels are not white, and instead are colored, rendering them unacceptable as particles in the low-solar absorptance white paint: $ZnFe_2O_4$, $CdFe_2O_4$, $ZnCr_2O_4$, $CdCr_2O_4$, $FeAl_2O_4$, $CoAl_2O_4$, $MnAl_2O_4$, and $NiAl_2O_4$. The spinel $MgAl_2O_4$ is white in color, but it cannot be readily doped to increase its electrical conductivity for electrostatic charge dissipation, because the magnesium cation is highly stable in the +2 ionization state. However, the $MgAl_2O_4$ spinel may be a useful pigment for some applications.

Figure 5:
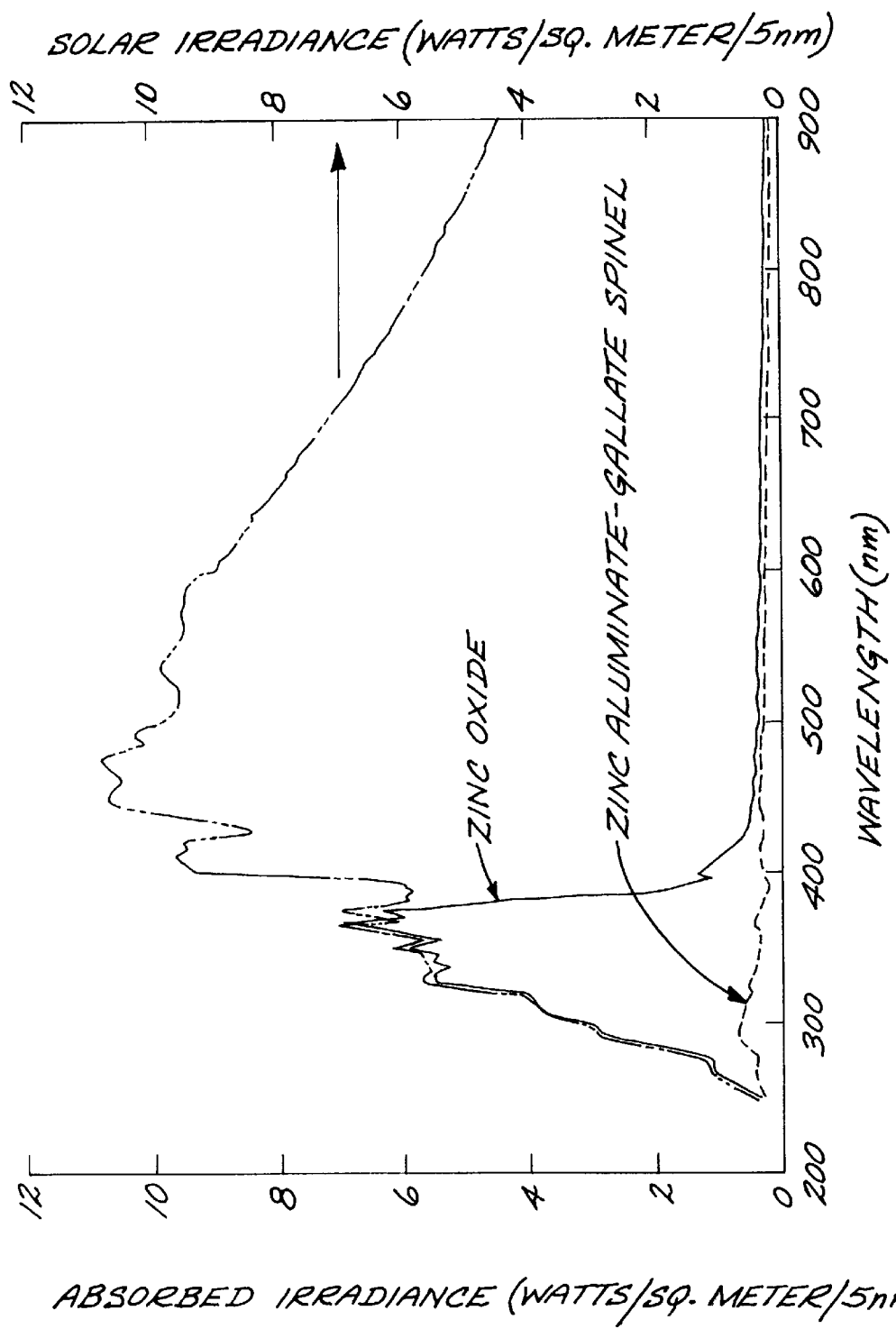
FIG. 5 is a graph of the solar energy absorption by ZnO powder and by $ZnAlGaO_4$ powder.

The $Zn[xAl(1-x)Ga]_2O_4(\delta D)$ compositions exhibit a lower solar absorptance over a wider wavelength range than do prior paint particles, as illustrated in FIG. 5. The energy band gaps of the $Zn[xAl(1-x)Ga]_2O_4(\delta D)$ spinels are greater than about 4.0 eV (electron volts). By comparison, the energy band gap of the ZnO wurtzite structure used in prior pigment formulations in U.S. Pat. No. 5,049,693 is about 3.2 eV. Consequently, the spinels of the invention reflect light with a very low solar absorptance much deeper into the ultraviolet range than do paints based upon ZnO pigments, such as described in U.S. Pat. No. 5,094,693. The band gap of ZnO may be increased by doping with aluminum, gallium, or indium, but only very slightly. Increasing additions of aluminum and/or gallium to ZnO result in the transformation back to an insulating phase such as $ZnAl_2O_4$.

The undoped $Zn[xAl(1-x)Ga]_2O_4$ spinel compositions normally do not provide sufficient electrical conductivity to dissipate surface electrostatic charges that may be present on the surface of the painted substrate, because they are insulators. To increase the electrical conductivity (or, alternatively stated, reduce the electrical resistivity), the composition may be reduced in a hydrogen-containing atmosphere or doped with a semiconductor material. The reduction in a hydrogen-containing atmosphere is not preferred, because it produces color centers that color the material so that it is no longer white. For other applications, particularly where a high electrical conductivity is desirable, some yellow coloration may be acceptable. Polyimide binders, for example, have a slight yellow color that masks any yellow color in the hydrogen-reduced pigment. For these applications, hydrogen-reduced pigment may be fully acceptable.

If the composition is to be doped, it is doped with a cationic dopant having a valence of greater than +2, or an anionic dopant. Preferably, the doping is with indium to produce a composition $Zn[xAl(1-x)Ga]_2O_4(\delta In)$, where $\delta$ is less than 0.2 (i.e., 20 atomic percent). As used herein, the terminology ($\delta In$) means that the composition is doped with a small amount $\delta$ of indium.

The doping is preferably accomplished by adding indium oxide, which also adds an inconsequential amount of oxygen to the composition. The composition may then equivalently be expressed as $(Zn,\delta In)[xAl(1-x)Ga]_2O_{4\pm\gamma}$, emphasizing the fact that the indium substitutes for zinc atoms on the A-sites of the spinel structure. In this expression of the formulation, the $\gamma$ quantity, which is also about 0.2 or less, reflects the fact that for preferred formulations the indium is added as the oxide $In_2O_3$, and the oxygen in this compound adds a small increment to the oxygen content of the spinel. This small addition does not adversely affect the properties of the spinel and in fact may be beneficial by reducing the incidence of color centers in the particles. Indium is chosen as the dopant because the $In^{+3}$ ion in four-coordination with oxygen has a radius of 76 picometers. The radius of the $Zn^{+2}$ ion in four-coordination in the spinel is 74 picometers, nearly the same. The indium ion therefore preferentially substitutes for the zinc ion in the spinel. The presence of the +3 valence indium ion in place of some +2 valence zinc ions in the spinel structure forces the zinc to accommodate an extra electron in order to preserve charge neutrality, resulting in an electrically conductive, n-type semiconductor spinel. Other dopants D meeting the indicated limitations, such as $Ti^{+4}$ (having an ionic radius of 74.5 picometers in six-coordination) may be used and provided as $TiO_2$, for substitution on the Al or Ga sites.

In a most-preferred approach, the addition of the dopant is balanced with controlled variations from the stoichiometric amounts of the cations forming the basic crystal lattice, to optimize the optical and electrical performance of the particulate material. For example, an addition of indium may be balanced with an addition of gallium or a reduction in zinc. The approach for performing the optimization is illustrated by the following development for dopant additions of indium and titanium.

When indium oxide is dissolved into zinc gallate, the reaction is expressed as $$In_2O_3 + 2Ga_2O_3 = 2In^x{}_{Zn} + 2(ZnGa_2O_4) + \tfrac{1}{2}O_2(g) \tag{1}$$

or $$In_2O_3 - 2ZnO = 2In^x{}_{Zn} + \tfrac{1}{2}O_2(g) \tag{2}$$

wherein the dissociation of the indium donor is expressed as $$In^x{}_{Zn} = In \cdot {}_{Zn} + e', \tag{3}$$

thereby donating an electron and increasing the electrical conductivity of the spinel.

These relations are expressed using standard Kroger-Vink notation used to describe defect chemistry of crystals. For example, $In^x{}_{Zn}$ represents an indium atom residing on a zinc lattice site in substitution for zinc, where X is a superscript which indicates a neutral charge with respect to the surrounding crystal. The donor $In^x{}_{Zn}$ dissociates to form a positively charged species $In \cdot {}_{Zn}$ with respect to the crystal and a mobile electron e'.

Doping of the spinel with titanium may be expressed with similar relations. The dissolution of titanium oxide into zinc gallate is expressed as $$2TiO_2 + ZnO = 2Ti^x{}_{Ga} + ZnGa_2O_4 + \tfrac{1}{2}O_2(g) \tag{4}$$

or $$2TiO_2 - Ga_2O_3 = Ti^x{}_{Ga} + \tfrac{1}{2}O_2(g) \tag{5}$$

wherein the dissociation of the titanium donor is expressed as $$Ti^x{}_{Ga} = Ti \cdot {}_{Ga} + e', \tag{6}$$

donating an electron and increasing the electrical conductivity of the spinel.

Relations (1), (2), (4), and (5) suggest that, when doping by an element such as In in substitution for the "A" site cation, or by an element such as Ti in substitution for the spinel "B" site cation, appropriate additions or subtractions of the "A" or "B" site spinel forming oxides, such as ZnO, $Ga_2O_3$, $Al_2O_3$, MgO, or CdO, may be made to optimize electrical conductivity and radiation behavior of the resulting pigment.

For example, to optimize the pigment $ZnGa_2O_4(\delta In)$ wherein the dopant D is In, present in $\delta$ amount, the pigment may be formulated as either $ZnGa_{(2+2\delta)}O_4(\delta In)$, with an excess of Ga as suggested by relation (1), or $Zn_{(1-\delta)}Ga_2O_4(\delta In)$, with a deficiency in Zn as suggested by relation (2), when indium is added as indium oxide. Such deviations of the basic spinel formula from stoichiometry may have significant effects upon electrical conductivity, radiation behavior, and optical properties.

It will be appreciated that the preceding discussion presents a most preferred approach, but that non-optimal doping of the pigment is still operable. For example, doping with indium or titanium without varying the amounts of the "A" or "B" cations is operable.

There may also be minor substitutions for the zinc, aluminum, and gallium cations in the formulation, as long as these substitutions result in a single phase, solid solution material having the spinel crystal structure. For example, cadmium may be substituted for a portion of the zinc, producing $(Zn,Cd)[xAl(1-x)Ga]_2O_4(\delta D)$. In another example, magnesium may be substituted for a portion of the zinc, producing $(Zn,Mg)[xAl(1-x)Ga]_2O_4(\delta D)$. The magnesium substitution lowers the index of refraction of the composition so that it is less opaque, an important advantage for some applications such as some electronics applications.

The components of the particles are provided and mixed together, numeral 40. In the preferred formulation procedure, readily available components ZnO, $Al_2O_3$, $Ga_2O_3$, and $In_2O_3$ are used as starting materials. Thus, to prepare $ZnAl_2O_4$, the appropriate amounts of ZnO and $Al_2O_3$ are mixed together. To prepare $ZnGa_2O_4$, the appropriate amounts of ZnO and $Ga_2O_3$ are mixed together. To prepare $Zn[xAl(1-x)Ga]_2O_4$, the appropriate amounts of ZnO, $Al_2O_3$, and $Ga_2O_3$ are mixed together. If any of these compositions is to be doped with indium, the appropriate amount of $In_2O_3$ is added to the mixture. A mixing medium, which later is removed, may be added to promote the mixing of the components. Preferably, water is used as the mixing medium.

The components and the mixing medium are milled together to form a mechanical mixture, numeral 42. After milling is complete, the mixing medium is removed by evaporation, numeral 44. The dried mixture is fired to chemically react the components together, numeral 46, at a temperature that is preferably in the range of from about 1000° C. to about 1300° C. A preferred firing treatment is 1175° C. for 6 hours, in air. After cooling, the agglomerated mass resulting from the firing is lightly pulverized, as with a mortar and pestle, numeral 48. The resulting particulate has a size range of from about 0.1 micrometer to about 5 micrometers. The preparation of the particulate pigment is complete.

In addition to the described $A[xAl(1-x)Ga]_2O_4(\delta D)$ pigment particles, the material may contain active or inert secondary particles to modify the optical properties and/or the mechanical properties of the final material. Active secondary particles interact optically with incident energy, and include, for example, aluminum-doped zinc oxide particles such as described in U.S. Pat. No. 5,094,693. Such active secondary particles may be utilized to improve the low-temperature electrical conductivity at the expense of optical properties, for particular applications. Inert secondary particles are those which serve primarily as filler to increase the volume fraction of particulate material present without greatly modifying the optical properties. The inert secondary particles may be added for economic reasons, as they are of lower cost than the pigment particles and active secondary particles. Inert secondary particles can include, for example, barium sulfate, clay, or talc. In one example, the total particulate loading could be 40 percent by volume $A[xAl(1-x)Ga]_2O_4(\delta D)$ pigment particles, 30 percent by volume aluminum-doped zinc oxide particles, and 30 percent by volume inert particles.

The paint is prepared by providing the particulate material, prepared as described above or otherwise. A binder is provided, numeral 50, to adhere the particles together in the final product. The binder is selected to provide good adherence of the particles to each other and of the particles to the underlying substrate, with acceptable physical properties. The binder must withstand the environment to which the paint is exposed, such as a space environment.

The binder is preferably cross-linked and polymerized dimethyl silicone copolymer, which is flexible and resistant to degradation in ultraviolet (UV) light. This binder is disclosed in greater detail in U.S. Pat. No. 5,589,274, whose disclosure is incorporated by reference. The silicone polymer exhibits a good degree of deformability without cracking, both when the pigment is present at moderate levels and when it is not present. This deformability permits the final solid paint to deform during the bending of the substrate when a thin substrate is used, or to permit the film to deform. The deformability of the binder also improves the resistance of the paint or film to cracking as a result of impacts and the like during service. Other flexible polymeric materials may be used for the matrix, such as silicone-modified epoxy, polyurethane, poly(dimethyl-siloxane), poly(dimethylsiloxane-co-methylphenylsiloxane), polyimide, and polyamide. However, experience has shown that the dimethyl silicone copolymer has the highest resistance to UV degradation, and it is therefore preferred.

The binder is present in an operable amount. In a typical case, the binder is present in an amount such that the ratio, by weight, of the total of all of the particulate to the binder is about 5:1 or less. If the ratio is more than about 5:1, the critical pigment volume concentration (CPVC) may be exceeded, the paint has insufficient mechanical strength, and the paint falls apart when dried. Preferably, the ratio by weight of particles to binder is from about 3:1 to about 5:1.

The mixture of pigment and binder is ordinarily a solid, and a paint vehicle may be added to form a solution or a slurry that may be applied using conventional painting techniques, numeral 52. The preferred paint vehicle is naphtha or xylene. The amount of the paint vehicle is selected to provide a consistency that will permit application of the paint by the desired approach. For example, application by spraying requires the use of more of the paint vehicle than application by brush or roller.

The paint may instead be applied by a technique where no vehicle is used, and in that case the step 52 is omitted.

The particles, binder, and paint vehicle are mixed together and milled together, numeral 54, to form a liquid paint formulation in which the particles do not rapidly separate. There may be some separation over extended periods of time, but the paint is normally stirred or agitated just before or at the time of application.

The preparation of the paint is complete.

Slight modifications to the approach discussed above are used to form a freestanding polymer film containing the particles. The pigment particles are prepared as described in steps 40–48. Instead of a paint binder, a polymeric film binder material such as a polyimide is supplied. (Other film binder materials such as polyester or polytetrafluoroethylene may be used, as well.) The particles are mixed with the polymer film binder and an appropriate film vehicle solvent, the mixture is formed into a film, sheet or other form by conventional procedures, and the vehicle is removed. The resulting structure is as illustrated in FIG. 3. The film may be applied over a surface by cohesion, adhesion with an adhesive, or covering and mechanically securing. It may also be suspended over the surface using fasteners such as hook-and-loop fasteners. The film imparts to the surface the same low absorptance properties as provided by the paint.

Returning to FIG. 4, the paint is used by providing the substrate 26 to be coated, numeral 56, and cleaning the substrate, numeral 58. There is no known limitation on the type of substrate. The surface of the substrate is cleaned by any operable non-aqueous technique, such as scrubbing and then wiping away residue with an organic solvent.

The paint is applied to the surface of the substrate, numeral 60. At the outset of the application, the surface of the substrate may be primed to improve the adhesion of the paint, but priming is not required in most cases where an organic binder is used.

The paint layer is thereafter applied by any operable technique, with spraying being preferred. As indicated earlier, the amount of paint vehicle present in the paint is selected to permit application by the preferred approach. At this point, the paint is a thin film of a liquid material. Tests with application of the paint prepared by the present approach have demonstrated that the paint layer is much smoother than achieved with prior approaches such as that of U.S. Pat. No. 5,094,693. This smoothness is particularly important when the paint is applied to an aircraft where skin drag must be minimized. It is also important for all applications in order to allow the surface to be readily cleaned.

The paint may also be applied by a plasma spray technique or the like wherein the mixture of pigment and binder is supplied to a heated region such as a plasma and directed toward the substrate. The plasma-heated mixture of pigment and binder strikes the substrate and solidifies thereon.

The paint is dried as necessary to leave a thin film of a solid material, numeral 62. Drying is preferably accomplished at ambient temperature with a 35 percent or greater humidity and for a time of 7 days. Drying removes the paint vehicle by evaporation. Additionally, the drying step may accomplish a degree of curing of any curable components, as where a curable organic binder is used. The paint layer is preferably from about 0.003 to about 0.006 inches thick.

The painting is complete.

The following is a specific example of the preparation of $ZnAlGaO_4$ pigment, preparation of paint using the pigment, and painting according to the procedure discussed above in relation to FIG. 4. A mixture of 89.99 grams of ZnO powder, 56.37 grams of $Al_2O_3$ powder, and 103.64 grams of $Ga_2O_3$ powder is weighed and mixed. The powders are added to a Roalox™ #0 jar mill containing a 50 percent charge of ½ inch cylindrical end-radius Burundum™ milling media. A milling aid of 600 milliliters of de-ionized water is added to the jar mill. The jar mill is sealed and the jar is rotated to mill the mixture for 12–24 hours, resulting in a homogeneous mixture. The slurried mixture is removed from the jar mill and placed into a pneumatically stirred container overnight, resulting in drying of the mixture. The resulting ceramic cake is lightly pulverized with a mortar and pestle. The pulverized material is fired in an oven in air at 1160° C. for 6 hours, producing the undoped $ZnAlGaO_4$ spinel material. The resulting ceramic cake is lightly pulverized in a mortar and pestle, resulting in the powder pigment material.

The pigment material is used to prepare a paint. A mixture of 4 parts by weight of the pigment material prepared as in the preceding paragraph, 1 part by weight of the dimethyl silicone binder, and about 1 to about 3 parts by weight of naphtha or xylene paint vehicle was prepared. This amount of the organic liquid as the paint vehicle is chosen to permit spray application of the paint, as described in the next paragraph, and may be varied as convenient. The mixture is added to a jar mill with a 50 percent charge of Burundum milling media. The mixture is milled for 12–24 hours to form the liquid paint.

The paint is applied by first furnishing a substrate, in this case a sheet of aluminum alloy or graphite/resin composite material. For application of this paint having an organic binder, the sheet is mechanically cleaned with sandpaper or a scouring pad. After scrubbing, any residual particles are removed by wiping with methylethylketone (MEK). Within five minutes after cleaning, the liquid paint formulation is applied by spraying. After the spraying is complete, the coupon is dried and cured at room temperature and 35 percent or greater humidity, for a time of at least 7 days.

The procedure for preparing pigment and paint, and for painting, described in the preceding three paragraphs is repeated, except that about 0.1 weight percent of indium oxide is added to the mixture of powders. The result is a pigment having a composition $ZnAlGaO_4$ doped with about 0.1 weight percent $In_2O_3$. As discussed previously, the oxygen content of the compound may be slightly greater than stoichiometric, but that is acceptable within the scope of the invention. The remainder of the procedures are as described above.

Figure 6:
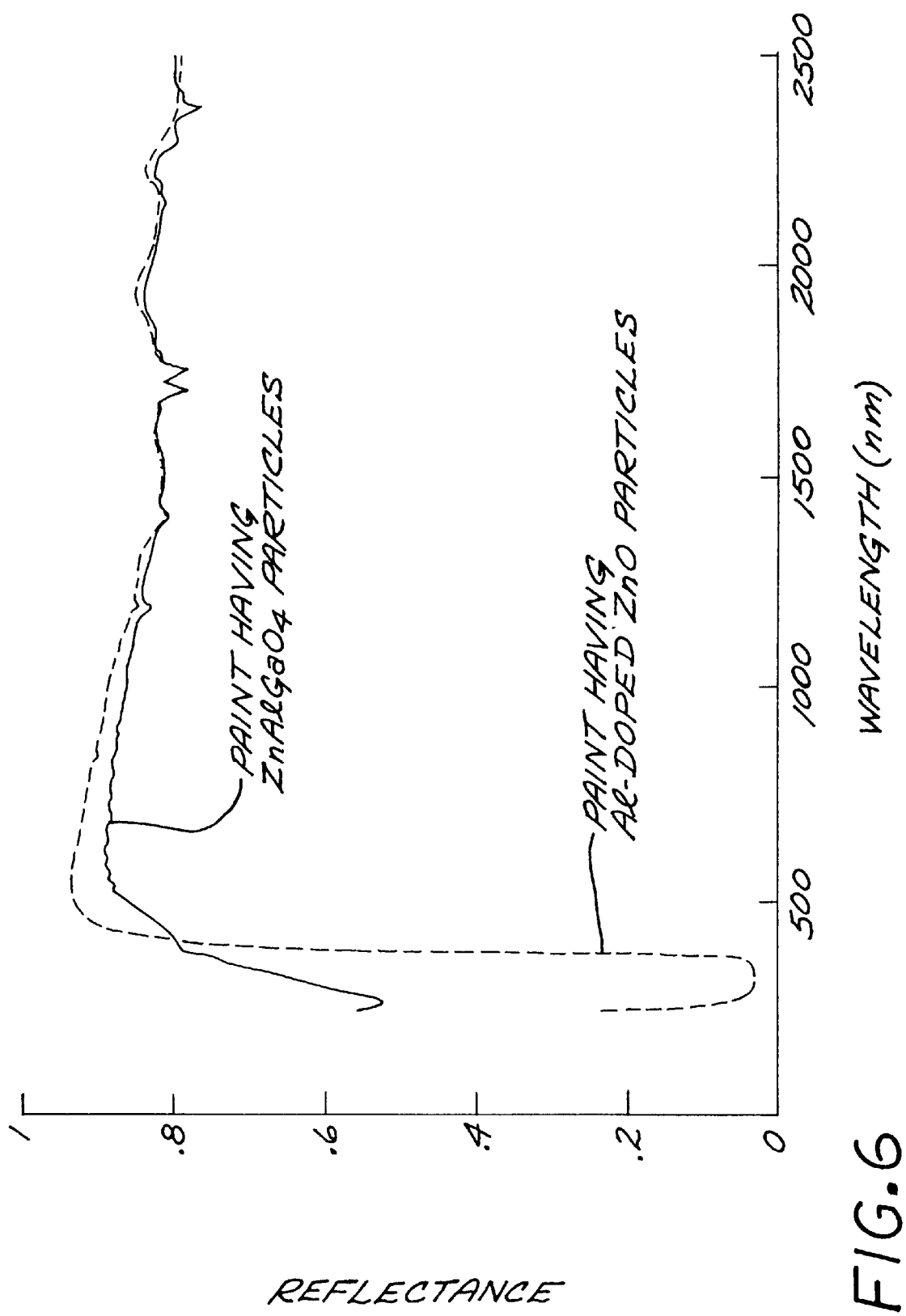
FIG. 6 is reflection spectra of organic-binder paint specimens using ZnO and $ZnAlGaO_4$ particles.

Tests have been performed of the optical performance of the paints made according to the invention and of prior paints. The paints of the present invention were prepared as described above. For a silicone-binder paint using undoped $ZnAlGaO_4$ on a Kapton™ polymer (polyimide) substrate, $\alpha$ was measured as 0.142; in a 0.004 inch coating on an aluminum substrate a was measured as 0.157. For comparison, a silicone-binder, ZnO-based paint using particles made according to the '693 patent had a higher $\alpha$ of about 0.18–0.22. The reflection spectra for specimens of these paints are presented in FIG. 6. The differences in solar absorptance between the paints of the invention and the prior ZnO-base paints are highly significant. The paints of the invention achieve much lower solar absorptances than the prior art ZnO-based paints, so that structures painted with these paints experience far less heating than structures painted with the prior paints.

Specimens were successfully prepared of powder pigments of both stoichiometric and non-stoichiometric $ZnAl_2O_4$, of both stoichiometric and non-stoichiometric $ZnGa_2O_4$, and of $ZnAlGaO_4$ (x=0.5 in the general form representation of the composition presented earlier). X-ray measurements demonstrated that the formulation of these powders was successful in preparing the indicated spinel materials.

Figure 7:
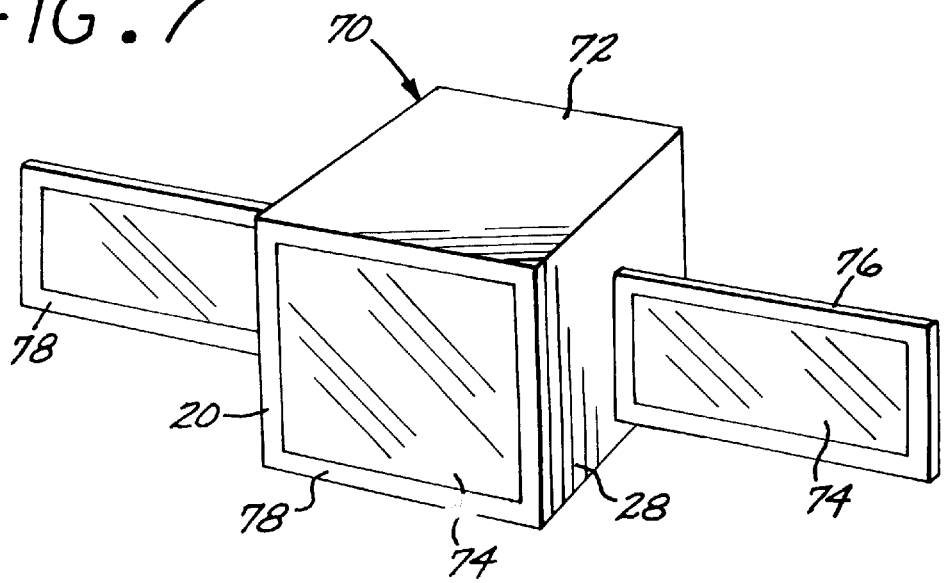
FIG. 7 is a perspective view of a spacecraft having a paint layer according to the invention.

The paint of the invention may be used in any thermal control application. Most preferably, it is used as a coating on a spacecraft, such as a satellite 70 illustrated in FIG. 7. The spacecraft 70, here depicted as a communications satellite that is positioned in geosynchronous orbit when in service, has a body 72 with solar panels 74 mounted either on the body 72 or on wings 76 that extend outwardly from the body 72, or both. The body 72 and wings 76 have a skin 78 which may be made of a metal, a nonmetal, or a composite material, and which may be supported by an underlying skeletal structure. At least some of those outwardly facing portions of the skin 78 of the body 72 and/or the wings 76 which are not solar panels are covered with the layer 20 of the paint of the invention or the freestanding film 28 of the invention, as described above. The skin 78 of the spacecraft thereby serves as the substrate 26 to which the paint layer 20 is applied. The paint layer 20 and/or the freestanding film 28 provide the covered portions with passive thermal control and electrostatic charge dissipation. The paint and film are sufficiently durable and stable in their properties for use on extended missions of 15 years or more.

Although particular embodiments of the invention have been described in detail for purposes of illustration, various modifications and enhancements may be made without departing from the spirit and scope of the invention. Accordingly, the invention is not to be limited except as by the appended claims.

What is claimed is:

1. An article comprising
    a plurality of particles comprising a plurality of pigment particles, wherein each pigment particle has a composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from 0 to less than 1, and the value of $\delta$ is from 0 to about 0.2; and
    an organic-compound binder mixed with the particles to form a mixture, wherein the ratio by weight of particles to binder is about 5:1 or less.

2. The article of claim 1, wherein A is Zn and x is 0, so that each particle has a composition of $ZnGa_2O_4(\delta D)$.

3. The article of claim 1, wherein A is Zn and x is 1, so that each particle has a composition of $ZnAl_2O_4(\delta D)$.

4. The article of claim 1, wherein A is Cd, so that each particle has a composition of $Cd[xAl(1-x)Ga]_2O_4(\delta D)$.

5. The article of claim 1, wherein the binder is dimethyl silicone.

6. The article of claim 1, wherein the binder is selected from the group consisting of silicone-modified epoxy, poly(dimethyl-siloxane), poly(dimethyl-siloxane-co-methylphenyl-siloxane), polyurethane, polyimide, polyamide, polyurea, polyester, and polytetrafluoroethylene.

7. The article of claim 1, wherein the mixture of binder and particles is a liquid.

8. The article of claim 1, wherein the mixture of binder and particles is a freestanding solid film.

9. The article of claim 1, wherein the mixture of binder and particles is a solid.

10. The article of claim 1, wherein the mixture of binder and particles is a solid paint layer in contact with a surface of a substrate.

11. The article of claim 1, wherein the ratio by weight of particles to binder is from about 3:1 to about 5:1.

12. The article of claim 11, wherein the solid layer has a thickness of from about 0.003 to about 0.006 inches.

13. The article of claim 1, further including
    a liquid paint vehicle, the particles, the binder, and the paint vehicle being mixed together to form a liquid mixture.

14. The article of claim 1, wherein each particle further comprises a solute element substituted for at least one of the elements selected from the group consisting of zinc, magnesium, aluminum, and gallium.

15. The article of claim 1, wherein the dopant D is indium.

16. The article of claim 1, wherein the dopant is an anion.

17. The article of claim 1, wherein the plurality of particles further comprises a plurality of optically active secondary particles which optically with incident energy and are of different compositions than the pigment particles.

18. The article of claim 1, wherein the plurality of particles further comprises a plurality of inert particles which serve as filler to increase the volume fraction of particulate material present and are of different compositions than the pigment particles.

19. The articles of claim 1, wherein A is Zn and $\delta$ is greater than 0, so that each particle has a composition of $Zn[xAl(1-x)Ga]_2O_4(\delta D)$.

20. A spacecraft, comprising
    a skin; and
    an article overlying the skin, the article comprising a plurality of particles comprising a plurality of pigment particles, wherein each pigment particle has a composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from 0 to less than 1, and the value of $\delta$ is from 0 to about 0.2, and an organic-compound binder mixed with the particles to form a mixture, wherein the ratio by weight of particles to binder is about 5:1 or less.

21. The spacecraft of claim 20, wherein the ratio by weight of particles to binder is from about 3:1 to about 5:1.

22. The spacecraft of claim 20, wherein the mixture of binder and particles is a freestanding solid film.

23. The spacecraft of claim 20, wherein the mixture of binder and particles is a solid paint layer in contact with a surface of the skin.

24. An article comprising a plurality of particles comprising a plurality of pigment particles, wherein each pigment particle has a composition of $A[xAl(1-x)Ga]_2O_4(\delta D)$, A is selected from the group consisting of magnesium and cadmium, D is a dopant selected from the group consisting of a cationic dopant having an ionic valence greater than +2 and an anionic dopant, the value of x is from 0 to 1, and the value of $\delta$ is in the range of from greater than 0 to about 0.2; and an organic-compound binder mixed with the particles to form a mixture, wherein the ratio by weight of particles to binder is about 5:1 or less.

25. A spacecraft, comprising a skin; and an article overlying the skin, the article comprising a plurality of particles comprising a plurality of pigment particles, wherein each pigment particle has a composition of $A[xAl(1-x)Ga]_2O_4(\delta D)$, A is selected from the group consisting of magnesium and cadmium, D is a dopant selected from the group consisting of a cationic dopant having an ionic valence greater than +2 and an anionic dopant, the value of x is from 0 to 1, and the value of $\delta$ is from 0 to about 0.2, and an organic-compound binder mixed with the particles to form a mixture, wherein the ratio by weight of particles to binder is about 5:1 or less.

26. An article comprising a plurality of particles comprising a plurality of pigment particles, wherein each pigment particle has a composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from 0 to 1, and the value of $\delta$ is greater than 0 and less than about 0.2; and an organic-compound binder mixed with the particles to form a mixture, wherein the ratio by weight of particles to binder is about 5:1 or less.

27. A spacecraft, comprising a skin; and an article overlying the skin, the article comprising a plurality of particles comprising a plurality of pigment particles, wherein each pigment particle has a composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from 0 to 1, and the value of $\delta$ is greater than 0 and less than about 0.2, and an organic-compound binder mixed with the particles to form a mixture, wherein the ratio by weight of particles to binder is about 5:1 or less.

28. An article comprising a plurality of particles comprising a plurality of hydrogen-reduced pigment particles, wherein each pigment particle has a composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from 0 to 1, and the value of $\delta$ is in the range of from greater than 0 to about 0.2; and an organic-compound binder mixed with the particles to form a mixture, wherein the ratio by weight of particles to binder is about 5:1 or less.

29. A spacecraft, comprising a skin; and an article overlying the skin, the article comprising a plurality of particles comprising a plurality of hydrogen-reduced pigment particles, wherein each pigment particle has a composition of $A[xAl(1-x)Ga]_2O_4(\delta D)$, A is selected from the group consisting of zinc, magnesium, and cadmium, D is a dopant selected from the group consisting of a cationic dopant having an ionic valence greater than +2 and an anionic dopant, the value of x is from 0 to 1, and the value of $\delta$ is from 0 to about 0.2, and an organic-compound binder mixed with the particles to form a mixture, wherein the ratio by weight of particles to binder is about 5:1 or less.

* * * * *